United States Patent [19]

Lannuzel

[11] Patent Number: 4,779,242

[45] Date of Patent: Oct. 18, 1988

[54] DEVICE FOR ELECTRONIC FOCUSING OF ULTRASONIC WAVES

[75] Inventor: Olivier Lannuzel, Villenoy les Meaux, France

[73] Assignee: C G R Ultrasonic, Villenoy les Meaux, France

[21] Appl. No.: 752,599

[22] Filed: Jul. 8, 1985

[30] Foreign Application Priority Data

Jul. 10, 1984 [FR] France ................................ 8410942

[51] Int. Cl.[4] .............................................. G01S 9/68

[52] U.S. Cl. .................................... 367/105; 367/103; 367/123; 73/626

[58] Field of Search ........................ 367/103, 105, 123; 73/625, 626; 128/660, 661; 343/375

[56] References Cited

U.S. PATENT DOCUMENTS 3,560,985 8/1967 Lyon .................................. 343/375

3,821,740 6/1974 Ehrlich .............................. 367/100

4,330,875 5/1982 Tachita et al. ...................... 367/105

*Primary Examiner*—Thomas H. Tarcza

*Assistant Examiner*—Daniel T. Pihulic

*Attorney, Agent, or Firm*—Oblon, Fisher, Spivak, McClelland & Maier

[57] ABSTRACT

A device for electronic focusing of ultrasonic waves in which the focusing means comprise a hierarchized assembly of elementary circuits each provided with a delay line connected in parallel with a direct line to a centralizing unit and in which the time-delay of the delay line in a circuit is a function of the relative time-delay which must exist between the two cells or the two circuits connected to said circuit. It is shown that, in the invention, a technological advance is achieved by thus minimizing the maximum time-delays to be established in the case of each delay line.

12 Claims, 4 Drawing Sheets

FIG_1-a
(PRIOR ART)
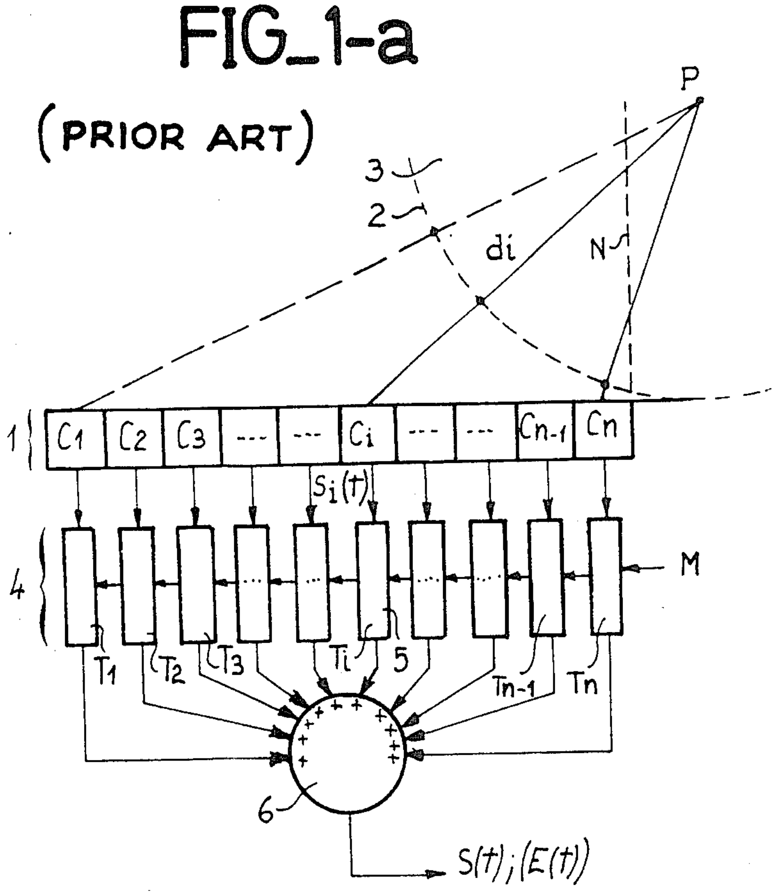
FIG_1-b
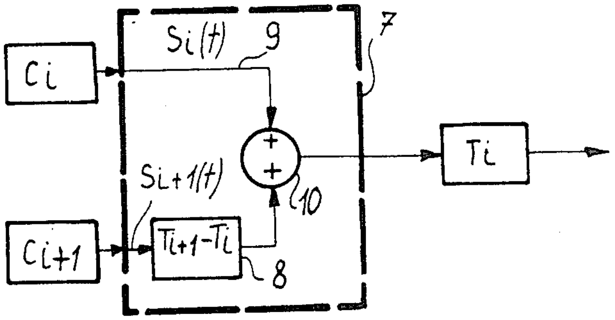

FIG_1-c
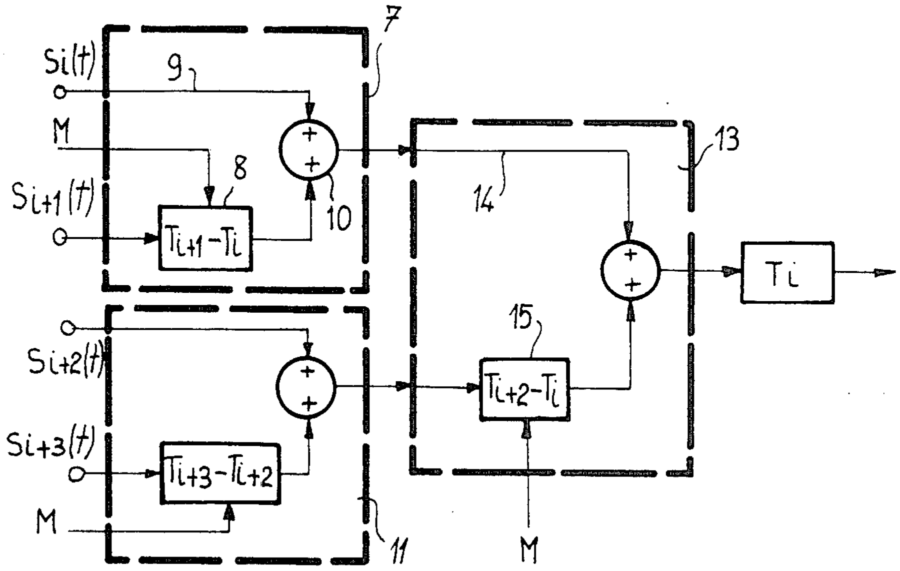
FIG_2-a
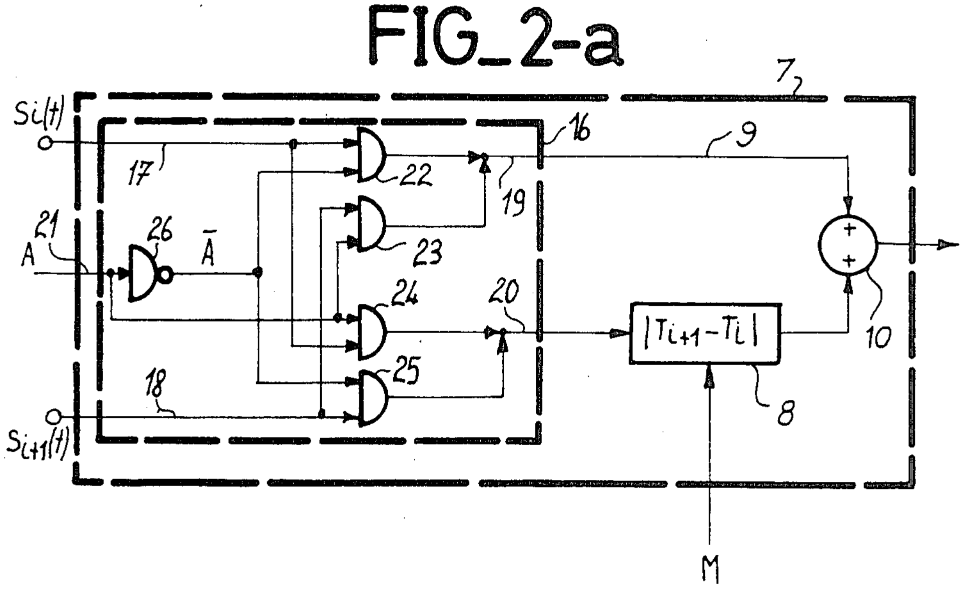

FIG_2-b
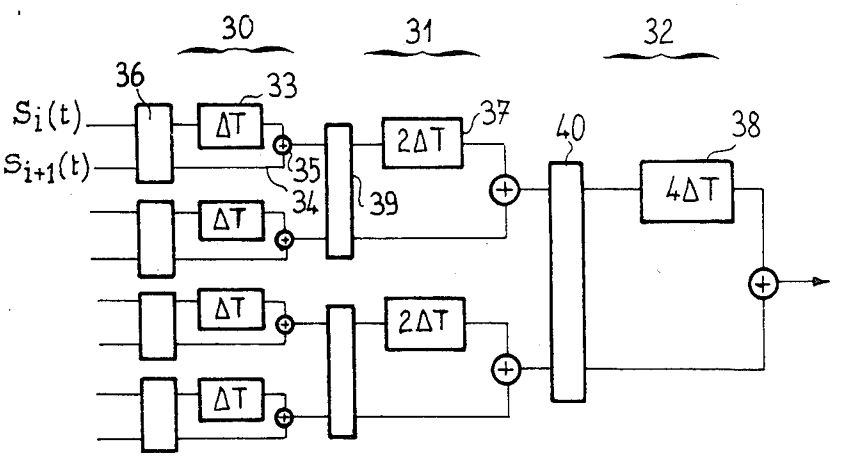
FIG_3-a
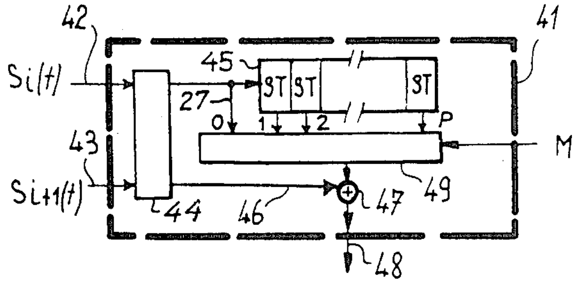
FIG_3-b
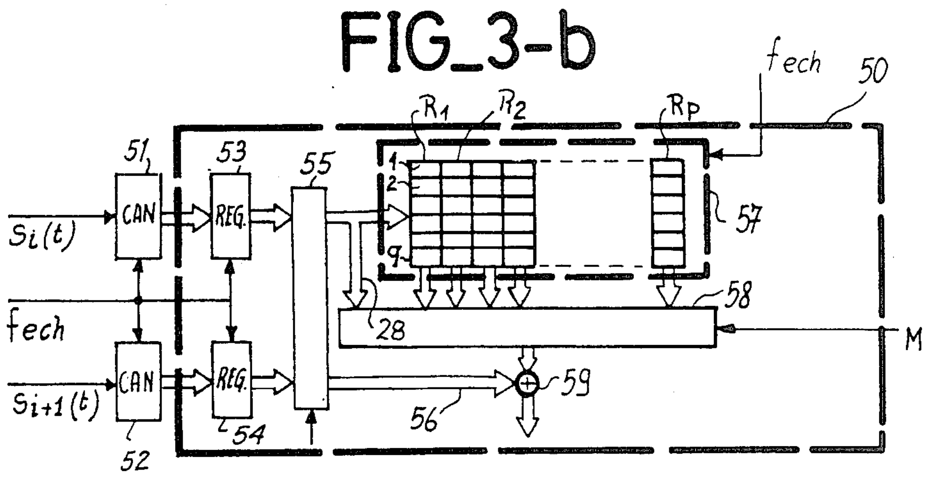

DEVICE FOR ELECTRONIC FOCUSING OF ULTRASONIC WAVES

BACKGROUND OF THE INVENTION

1. Field of the Invention

This invention relates to a device for electronic focusing of ultrasonic waves.

2. Description of the Prior Art

Ultrasonic-wave devices are in particularly common use in the medical field and in industrial control. Their general function is to permit measurement of physical parameters of a medium in which these waves are transmitted and/or received. For the purpose of transmission, an ultrasonic device comprises an electrical signal transmitter connected to a piezoelectric excitation probe. For the purpose of reception, an ultrasonic device comprises a piezoelectric probe connected to a receiver. In conventional practice, a duplexer permits the use of a single reversible probe for transmission and reception while dividing the length of time between these two functions.

The mechanical pressure wave which propagates from a probe within a medium is a spherical wave. In consequence, the quantity of excitation energy applied at a particular point of the volume under study decreases with the square of the distance between said point and said probe. Moreover, the same phenomenon takes place at the time of reception. Thus the back-scattered signal originating from a particular point of the medium also propagates as a spherical wave. In order to increase the excitation power applied to a particular point of the medium at the moment of transmission, and in order to increase the energy of the signal received from a particular point at the moment of reception, it is known to provide probes comprising an array of piezoelectric cells. In order to permit achievement of expected effects, it is also necessary to establish time-delays between the electric signals which are applied to the different cells of the array. These time-delays are intended to focus the wave on the point considered and are obtained in accordance with conventional practice by employing delay lines connected in series with the cells. The time-delays of each delay line are fixed at values which are predetermined in respect of a given position of the point of the medium on which it is desired to focus the transmission wave or from which it is desired to receive the transmitted wave. Each cell is associated with a particular delay line and the number of delay lines corresponds to the number of cells.

Moreover, it is a desirable objective to have the possibility of employing ultrasonic devices for pointing them at different regions of the medium. These regions are contained between two extreme directions of relative angular displacement. It is advisable in this case to provide delay lines in which the time-delay is variable and in which the maximum time-delay corresponds to these extreme directions. Postulating, for example, a relative angular displacement of 45° with respect to a normal axis of propagation at right angles to the array of cells, a propagation velocity of 1500 m per second within the medium and a distance of approximately 100 mm between the point sighted and the array, it is apparent that a wave which is again in phase at the point considered permits time-delay shifts between the different cells of the array. These shifts are such that, in particular, there exists a maximum differential time-delay of approximately ten microseconds between two end cells of an array which measures approximately 22 mm in length. In order to permit scanning of all points of the medium identically and symmetrically with respect to a line normal to the center of the array, the time-delays of the delay lines relating to the cells located at the ends of the array must be identical. However, the fabrication of delay lines is attended by many technical and technological problems. It is necessary to reduce the number of delay lines and especially the duration of their intrinsic time-delay.

SUMMARY OF THE INVENTION

The invention relates to a fousing device in which the time-delay of the delay lines is shorter than the maximum differential time-delay of the array and in which, in the final analysis, the total quantity of time-delays of all the delay lines is considerably smaller than the total quantity of time-delays of all the delay lines of the prior art.

The invention relates to a device for electronic focusing of ultrasonic waves in which an ultrasonic wave is propagated in one direction and/or in another between an array of piezoelectric cells and a focal point located within a medium, in which the electric signal corresponding to said wave is transmitted with different time-delays in the case of each cell, these time-delays being dependent, in the case of each cell, on the relative positions of the focal point and of the cell considered, and in which means for producing time-delays comprise delay circuits connected to the cells. In accordance with a distinctive feature of the invention, said means for producing time-delays comprise a hierarchized assembly of elementary circuits, each circuit being provided with a delay line connected in parallel with a direct line to a centralizing unit. A further characteristic feature lies in the fact that the time-delay of the delay line in an elementary circuit is a function of the relative time-delay which must exist between two cells or two circuits connected to said circuit.

BRIEF DESCRIPTION OF THE DRAWINGS

Other features of the invention will be more apparent upon consideration of the following description and accompanying drawings, wherein:

FIG. 1*a* illustrates an ultrasonic-wave device in accordance with the present state of the art;

FIG. 1*b* shows an elementary circuit of the time-delay means in accordance with the invention;

FIG. 1*c* is a representation of the hierarchical arrangement of the elementary circuits in accordance with the invention;

FIG. 2*a* shows an improvement of the elementary circuit;

FIG. 2*b* is a schematic representation of the delay means in accordance with the invention and serves to demonstrate the quantitative gain of the time-delays to be established;

FIG. 3*a* shows an example of analog design of an elementary circuit;

FIG. 3*b* shows an example of digital design of an elementary circuit;

DESCRIPTION OF THE PREFERRED EMBODIMENTS

Figure 4:
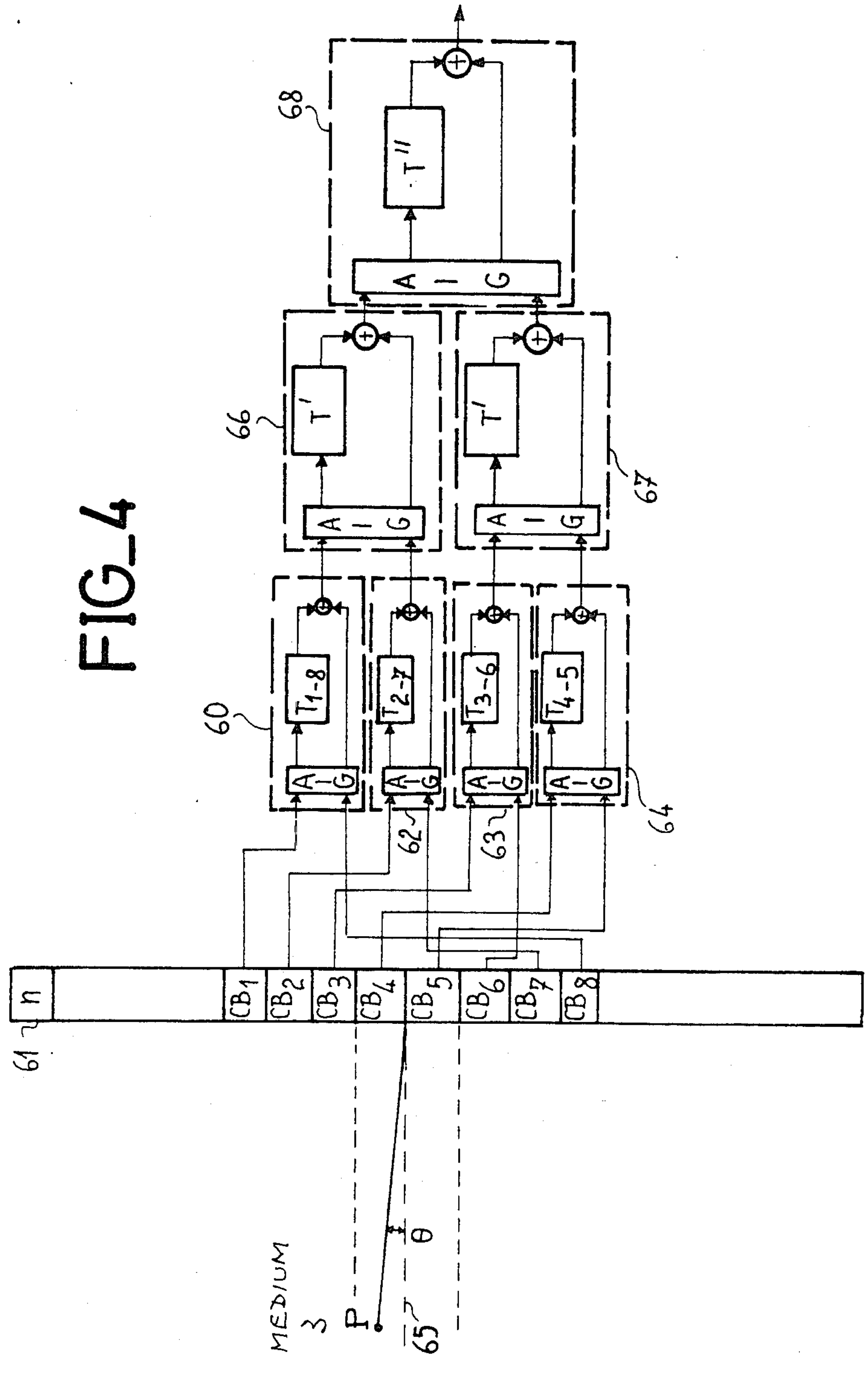
FIG. 4 shows one example of utilization of the invention.

FIG. 1 illustrates an ultrasonic-wave device in accordance with the prior art. The device comprises a piezoelectric probe 1 provided with an array of n cells $C_i$. An ultrasonic wave 2 propagates from a point P of a medium 3 towards the probe. The wave 2 is a spherical wave. The pressure wave is detected by the cells $C_i$ and is converted to a series of electric signals $S_i(t)$. The cells are connected to delay means 4 comprising an array of identical delay lines such as the line 5. A multiplexing instruction M establishes a specific time-delay $T_i$ for each delay line. The wave 2 which is received at different instants by the different cells $C_i$ is then extracted simultaneously from the entire array of delay lines. A time-delay $T_i$ can be expressed as follows:

$$T_i = T(\text{maximum differential}) - d_i/c$$

where $d_i$ is the distance from a cell $C_i$ to the point P and where c is the velocity of propagation of the wave 2 within the medium 3. A multiple-input adder 6 receives the signals $S_i(t)$ after they have been subjected to their respective time-delays and combines them in order to deliver a signal S(t), said signal being representative of the wave which has been emitted at the point P.

In the illustration of FIG. 1*a*, the ultrasonic device is employed for reception. When employed for transmission, the adder 6 is replaced by a current distribution point (quite simply an electrical connection point) and a signal E(t) which arrives at this collection point in the direction opposite to the signal S(t) drives the array 4 of delay lines 5. If the distribution of time-delays in the different lines is identical with the previous distribution, the sound wave emanating from the probe 1 is then focused on the point P. In consequence, from the point of view of time delays, it makes no difference whether the problem is studied in the sending mode or in the receiving mode. For the sake of enhanced clarity, a receiving-mode configuration will be assumed by way of example in the description which now follows although it will be understood that the focusing device in accordance with the invention can also serve for transmission. Similarly, the use of reversible probes is not essential but is none the less more economical in practice.

The distinctive feature of the invention lies in the fact that the delay means 4 are replaced by a hierarchized assembly of elementary circuits. FIG. 1*b* presents an elementary circuit and FIG. 1*c* shows how the hierarchy is arranged. The elementary circuit 7 of FIG. 1*b* essentially comprises a delay line 8 connected in parallel with a direct line 9 to a centralizing unit 10. In a transmission application, the centralizing unit is an electrical connection point. In a receiving application, the centralizing unit 10 is an adder for adding the signals derived from the two lines 8 and 9. The circuit 7 has two inputs and one output. The direct line 9 of the circuit 7 receives a signal $S_i(t)$ emanating from a sensor $C_i$. The delay 8 of the circuit 7 receives a signal $S_{i+1}(t)$ emanating from a sensor $C_{i+1}$. The invention lies in the observation that, instead of assigning a time-delay $T_i$ and $T_{i+1}$ respectively to each signal $S_i(t)$ and $S_{i+1}(t)$, it is possible to assign a time-delay $T_{i+1}-T_i$ to one signal. After adding these two signals, a time-delay $T_i$ is assigned to the result. In the added signal, the contribution of the signal $S_i(t)$ is in fact subjected to a time-delay $T_i$ and the contribution of the signal $S_{i+1}(t)$ is effectively subjected to a time-delay $T_{i+1}(T_{i+1}-T_i+T_i)$. This is clearly possible only if $T_{i+1}$ is of higher value than $T_i$ since no method has yet been found for producing a negative time-delay.

It will be observed from FIG. 1*b* that the signal emanating from the circuit 7 must have an assigned time-delay $T_i$. Similarly in FIG. 1*c*, a circuit 11 adjacent to the circuit 7 receives signals $S_{i+2}(t)$ and $S_{i+3}(t)$. A time-delay $T_{i+2}$ must be assigned to the output of said circuit 11 in order to ensure that each signal of said circuit cooperates in the achievement of the final result by making a correct contribution. By bringing the signal emitted by the circuit 7 into closer relation with the signal emitted by the elementary circuit 11, these two signals can be fed into a third elementary circuit 13 which also comprises a direct line 14 in paralled with a delay line 15. The time-delay of the delay line 15 must be equal to $T_{i+2}-T_i$. The time-delay assigned to the signal delivered by the circuit 13 must then have a value $T_i$ in order to ensure that the time-delays assigned to all the signals each have their respective value $T_i$, $T_{i+1}$, $T_{i+2}$, and $T_{i+3}$.

The structure of the elementary circuit of FIG. 1*b* calls for three remarks, In the first place, construction of the hierarchy of circuits can be continued in a pyramidal manner in accordance wiht the structure suggested in FIG. 1*c*. In the seocnd place, taking into acount the complexity involved in the fabrication of delay lines having a high maximum varable time-delay, it is an advantage to connect the circuits 7 to adjacent cells and similarly to connect the circuits 13 to adjacent elementary circuits. In fact, the relative delay time taken by the wave 2 to arrive at two geographically adjacent cells is of short duration. It is for this reason that two adjacent cells $C_i$ and $C_{i+1}$ are connected to a single circuit. Thus the delay line 8 must be capable of a maximum time-delay which, in the final analysis, is of somewaht short duration. It is also for this reason that two adjacent circuits 7 and 11 are connected to one and the same circuit 13. Two elementary circuits are thus referred-to as adjacent when, at their hierarchical level, the signals produced by these circuits have a relative time-delay which is as short as possible. A third point worthy of note is that the time-delay $T_i$ applies to the signals received by all the cells. It is possible to dispense with the above-mentioned delay line since it fails to contribute to better focusing which produces identical action on all the signals.

The foregoing restruction which entails the need to ensure that $T_{i+1}$ is higher value that $T_i$ implicitly indicates that the point P can be located only to the right of the dashed line N normal to the array at the level of the last cell $C_n$. In fact, the cells receive the wave 2 in this case earlier as their index C is higher (the cell $C_n$ is thus the first to receive the wave). The time-delay $T_n$ will therefore be longer than the time-delay $T_{n-1}$, and so on up to the time-delay $T_1$. In roder to be able to focus the wave on points located to the left of the cell $C_i$, it would be necessary to have the possibility of constructing delay lines in which the time-delay $T_{i+1}-T_i$ is a negative time-delay. This apparently insoluble problem is solved (as shown in FIG. 2*a*) by adding to the elementary circuit 7 a switching circuit 16 which makes it possible to choose which of the two signals $S_i(t)$ or $S_{i+1}(t)$ will have the assigned time-delay $T_{i+1}-T_i$. In fact, if $T_{i+1}-T_i$ is negative, the correct result is obtained by delaying the other signal by the absolute value of $T_{i+1}-T_i$. The switching circuit 16 therefore has two inputs 17 and 18 and two outputs 19 and 20. This circuit also has a control input 21 for receiving a switching signal A. In one example, the switching circuit 16 comprises four analog gates 22 to 25 for receiving the signals $S_i$ and $S_{i+1}$ respectively in pairs (22, 24 and 23, 25). The order A or its complementary $\bar{A}$ obtained from an inverter 26 is applied to the validation input of said analog gates so as to transmit on the one hand the signals $S_i(t)$ and $S_{i+1}(t)$ respectively or on the other hand the signals $S_{i+1}(t)$ and $S_i(t)$ respectively, at the outputs of said gates, on the outputs 19 and 20 of the circuit 16. This makes it possible in the final analysis to delay only one of these two signals with respect to the other and to the desired extent.

It should nevertheless be pointed out that, in regard to the distribution $S_i(t):S_{i+1}(t)$ of the signals, the position of the delay line is not without importance. If the diagram of FIG. 1*b* is reconsidered after having reversed the inputs by means of the switching circuit 16, by reason of the fact that the time-delay $T_{i+1}-T_i$ is negative, it must be realized that the signal $S_i(t)$ has been delayed in this case by an amount equal to $T_i-T_{i+1}$ and that it is consequently no longer a time-delay $T_i$ but a time-delay $T_{i+1}$ which would have to be established at the output of the circuit 7 after the adder 10. This remark is important since it is thus possible to combine with accuracy in a circuit 13 (FIG. 1*c*) the signals derived from two elementary circuits 7 and 11 when the inputs have been reversed. In practice, this question of a time-delay $T_i$ changed to $T_{i+1}$ does not give rise to any problem since the delay imposed by the delay line is variable. There is therefore no difficulty in making it equal to $T_{i+1}-T_{i+3}$ instead of $T_{i+2}-T_i$. A control signal M which is comparable in every respect with the multiplexing signal of the prior art already mentioned controls the delay lines in accordance with the invention. The only changes between the invention and the prior art are the values displayed for the different delay lines.

FIG. 2*b* makes it possible to gain an understanding of the technological advance achieved in the cumulation of time-delays obtained with the delay means in accordance with the invention. The hierarchical structure comprises a plurality of stages. A first stage 30 combines in elementary circuits signals delivered each time by two adjacent cells. A second stage 31 combines the signals delivered by two adjacent circuits of the stage 30. A third stage 32 combines the signals delivered by two adjacent circuits of the stage 31. The circuit of FIG. 2*b* comprises in the case of each elementary circuit a delay line 33 in parallel with a direct line 34, both lines being connected on the one hand to a centralizing unit 35 and to a switching circuit 36. The difference between one stage and another lies in the fact that the maximum differential time-delays of the delay lines of the stages are not equal to each other. In fact, the maximum time-delay of a delay line 33 is imposed by the relative time-delay which can exist when the probe is at the maximum relative angular displacement between two adjacent cells (that is to say cells in which the index differs only by one unit). Let $\Delta T$ be this maximum time-delay. The maximum time-delay of the delay lines 37 of the second stage is the time-delay which must exist between two cells in which the index has a difference of two units: for example between $C_i$ and $C_{i+2}$. In consequence, the maximum time-delay of the lines 37 is equal to twice the value $\Delta T$. By extrapolation, the maximum time-delay of the delay line 38 of the third stage is $4\Delta T$. In the example shown, in order to be able to achieve all configurations of relative angular displacement which may be desired, it is necessary to provide four delay lines with a variable time-delay having a maximum value $\Delta T$, two variable-delay lines in which the maximum time-delay has a value $2\Delta T$, and a variable-delay line in which the maximum time-delay has the value $4\Delta T$. In all, provision must therefore be made for $12\Delta T$. On the other hand, since the time-delay which can exist between the cell having an index 1 and the cell having an index 8 can be equal to $7\Delta T$, it would have been necessary in the prior art to construct eight variable-delay lines with a maximum time-delay of $7\Delta T$ in each case, that is to say a total of $56\Delta T$. It is accordingly observed that the invention achieves a quantitative reduction of time-delays to be established. It can be shown by calculation that this reduction is equal to $\frac{1}{2}\log_2(n)$. In this expression, n is the number of cells. It is further apparent that, qualitatively, the maximum variable time-delay for one delay line is $4\Delta T$ in accordance with the invention. On the other hand, it was $7\Delta T$ in the prior art. In point of fact, the fabrication of delay lines is more difficult technically as the time-delay to be established is of longer duration. In consequence, the invention also contributes a qualitative improvement to a quantitative reduction. I could be demonstrated that this qualitative improvement is explained by the presence of the switching devices 36, 39 and 40 in front of each elementary circuit.

FIG. 3*a* represents an analog design of an elementary circuit 41 in accordance with the invention. This circuit 41 has two inputs 42 and 43 connected to the inputs of a switching circuit 44, the outputs of which are connected on the one hand to an analog delay line 45 and on the other hand to a direct line 46. The delay line 45 is of the lumped-constant type, for example. An adder 47 centralizes the signals derived from these two lines. The output 48 delivers the combined signal. The delay line 45 is provided with p intermediate taps for ensuring that a signal fed to the input is delayed up to p times a minimum time-delay. In addition, a direct connection 27 permits collection of the signal introduced in the delay line 45 when this latter has a zero relative time-delay with respect to the signal on the line 46. If said minimum time-delay is designated as $\delta T$, the product of p times $\delta T$ has the value $\Delta T$ which is the maximum time-delay of the line 45 and therefore of the circuit 41. A multiplexer 49 receives a multiplexing order M and selects a particular tap of the delay line 45 in order to connect it to the input of the adder 47. The multiple 49 used here performs the same function as in the prior art mentioned earlier. However, its complexity is lower in the present invention since the time-delay produced by the delay lines is of shorter duration and the number of intermediate taps to be selected is therefore smaller.

It will be readily apparent that the instructions M of the invention are different from those of the prior art. It should be noted, however, that the number of multiplexing orders contained in a multiplexing instruction M in respect of a given focusing operation is substantially equal to the number of multiplexing orders which had to be given in the prior art. It is in fact observed with reference to FIG. 2*b* that, in the case of eight cells, there are seven delay lines to be programmed. There are consequently seven multiplexing orders to be addressed to the delay lines at each multiplexing instruction. In a conventional configuration for the same eight cells, there would be eight delay lines and therefore eight orders to be addressed. In the invention, the number of orders to be addressed therefore corresponds to the number of cells less one unit. In other respects, programming of orders M is performed in the same manner as in the prior art. This programming operation consists in computing the corresponding time-delay $T_i$ for each cell $C_i$ in respect of a given point of the space on which it is desired to focus the waves and in deducing, in accordance with the hierarchical arrangement defined earlier, which time-dela $T_{+1}-T_i$, $T_{i+2}-T_i$ and so on has to be established for each elementary circuit. The multiplexing instruction relating to this position which contains all the multiplexing orders is then established. Similarly, the switching orders A to be addressed to the different switching circuits are established. All these orders are stored in memory. This operation is repeated a number of times corresponding to the number of different points to be scanned in the medium. The sequences of orders relating to each point are then addressed to the delay means as and when required at the time of experimentation.

FIG. 3*b* shows a digital design of an elementary circuit 50 in accordance with the invention. On the upstream side of said circuit 50, signals $S_i(t)$ and $S_{i+1}(t)$ emanating from cells $C_i$ and $C_{i+1}$ are each delivered to an analog-to-digital converter 51 and 52 respectively. These converters are in relation with intermediate registers 53 and 54 contained in the circuit 50. A switching unit 55 selectively orients the contents of these registers to a direct line 56 or to an array 57 of shift registers. The array 57 contains a number of registers corresponding to the number of bits for coding the sampled values of the signals $S_i(t)$. If these signals are coded on q bits, there are q shift registers. Each of these shift registers comprises p storage locations and the array 57 is synchronized with the sampling frequency $f_{ech}$ which controls the converters 51 and 52. A direct connection 28 serves to collect without delay the signal fed into the delay line 57 when the relative time-delay of said signal with respect to the signal in the direct line is zero. At each sampling pulse, the contents of a given storage location of a register are transmitted to the following storage location of said register (from $R_j$ to $R_{j+1}$). A multiplexer 58 which receives a multiplexing order M corresponding to a point P of the medium extracts the contents of the corresponding storage locations of the register. The summing device 59 receives quantized signals from the direct line 56 and from the delay line 57. The digital output of the summing device 59 is coded in q+1 bits. When the circuit 50 is placed in a higher stage of the hierarchy, it receives quantized signals emanating from the preceding elementary circuits and is no longer connected downstream of an analog-to-digital converter.

There are cases of utilization of ultrasonic devices in which an ultrasonic-wave antenna is constructed in the form of a linear strip array of cells. In an antenna consisting of n cells (for example, n=100), it is possible to select a small group of contiguous cells (eight to sixteen cells, for example) in order to form an ultrasonic beam in a direction which is substantially perpendicular to the antenna or which may be very slightly inclined with respect to the normal. It is not sought to obtain large relative angular displacements with probes of this type. Steps are taken on the contrary to focus only points such that the projection on the linear strip array is always contained in the segment which comprises the central cells of the group of contiguous cells. In this scanning mode, it is found that practically equal time-delays must be assigned to two cells which are symmetrical with respect to the center of the group of cells chosen. In the final analysis, these cells therefore have the lowest possible relative time-delay. The considerations which have thus far won acceptance in the case of adjacent cells teach the need to associate cells in symmetrical relation with respect to the center of the group.

FIG. 4 illustrates an eight-cell structure of this type. An elementary circuit 60 receives signals from two cells $CB_1$ and $CB_8$ of a strip array 61. A second circuit 62 receives signals from the cells $CB_2$ and $CB_7$, a third circuit 63 receives signals from the cells $CB_3$ and $CB_6$ and the fourth circuit 64 receives signals from the cells $CB_4$ and $CB_5$. The time-delays $T_{1\text{-}8}$, $T_{2\text{-}7}$, $T_{3\text{-}6}$ and $T_{4\text{-}5}$ of the delay lines of said elementary circuits are therefore minimum time-delays. In fact, the point P is located only at a very short distance from the median line 65 of the array of cells. In the final analysis, the delay line whose maximum time-delay has the highest value is the delay line which produces the time-delay $T_{1\text{-}8}$. This time-delay $T_{1\text{-}8}$ corresponds to the wave-path difference when the wave propagates from the point P on the one hand to the cell $CB_1$ and on the other hand to the cell $CB_8$. In the case of all the other delay lines, the relative time-delays are shorter. In this case also, it is found that the aforesaid time-delay $T_{1\text{-}8}$ which is of longest duration is considerably shorter than the time-delay $T_{4\text{-}8}$ which would have the longest duration in the example and is in fact five times longer than said time-delay $T_{1\text{-}8}$.

The circuits 60 and 62 to 64 are connected to two elementary circuits 66 and 67. These two circuits are in turn connected to a last elementary circuit 68. Taking account of the small relative angular displacements $\theta$ employed, it would be possible to dispense with the presence of the switching circuits (AIG) which are contained within each of the elementary circuits. The presence of these switching circuits lies in the scanning capability of the probe employed. In fact, the microangulations $\theta$ designate points P whose projection on the strip array 61 cannot be located beyond one of the central cells ($C_4$ $C_5$). As soon as the medium 3 has been scanned between $+\theta$ and $-\theta$, recourse is had to another cell having an adequate length of side while eliminating from the array of cells the cell which is located on the other side. It becomes apparent that, from one cell to the next in succession, the time-delay between two cells thus undergoes a change of sign. This justifies the presence of the switching circuits.

In this application, scanning of the medium to be studied results in a selection of the cells $CB_i$ employed. The multiplexer which performs this function is of a known type. Should it be desired to carry out the invention in this application without modifying said multiplexer, a possible choice consists in effecting the optimizations of the relative time-delays at the output of the first stage. The elementary circuits of the first stage then receive signals from cells $CB_i$ which are geographically adjacent ($CB_i-CB_{i+1}$) Into a second stage (66–67) are fed signals emanating from elementary circuits 60–62 and 63–64 which in turn receive signals delivered from cells which are geographically symmetrical with each other with respect to the center of the group of contiguous cells chosen.

The conversion of the switching circuits for change-over of a device from a receiving function to a transmitting function does not present any difficulty. The sole requirement is the construction of a second set of switching devices interposed between the different circuits or between the circuits and the cells. This second set receives the signals from the delay lines and applies them to the piezoelectric cells. This set is oriented in the direction opposite to that described but is of identical design.

What is claimed is:

1. A devie for electronic focusing of ultrasonic waves in which an ultrasonic wave propagates in one direction and/or in another between an array of piezoelectric cells and a focal point located within a medium, in which the electric signal corresponding to said wave is transmitted with difference time-delays in the case of each cell, said time-delays being dependent in the case of each cell on the reltive positons of the focal point and the cell considered, and in which the means for producing time-delays comprise delay circuits connected to said cells, wherein said means for producing time-delays comprise a hierarchized assembly of elementary circuits arranged in plural levels, wherein the piezoelectric cells of said array are coupled only to respective elementary circuits of a first level of the hierarchized assembly and the elementary circuits of said first level and each succeeding level are respectively coupled to the elementary circuits of the respective next succeeding level of the hierarchized assembly, each elementary circuit comprising a delay line connected in parallel with a direct line to a centralizing unit, wherein the time-delay of the delay line in a elementary circuit is a function of the relative time-delay which must exist between two cells or between two elementary circuits of the hierachized assembly of elementary circuits aforesaid, and wherein each individual elementary circuit comprises a switching device for reversing the relative time-delay between the two cells or between the two elementary circuits which are connected to said individual elementary circuit.

2. A device according to claim 1, wherein the two cells or the two elementary circuits connected to an elementary circuit are adjacent to each other.

3. A device according to claim 2, wherein said device comprises means for ensuring that the ultrasonic wave propagates from the cells to the focal point at the time of transmission.

4. A device according to claim 3, wherein the centralizing unit is an electrical connection point.

5. A device according to claim 3, wherein said device comprises means for causing the wave to propagate from the focal point to the cells at the time of reception.

6. A device according to claim 5, wherein the cells are reversible piezoelectric cells.

7. A device according to claim 5, wherein the centralizing unit is an adder.

8. A device according to claim 7, wherein the number of stages of the hierarchy of circuits is equal to the logarithm to base 2 of the number of cells.

9. A device according to claim 1, wherein said means for producing time-delays comprise delay circuits connected to pairs of said cells, said time-delay of the delay line in an elementary circuit is a function of the relative time-delay which must exist between the two cells of a pair of cells or between the two elementary circuits of a pair of elementary circuits, and no cell is directly connected to more than one elementary circuit.

10. A device according to claim 1, wherein two cells connected to one and the same elementary circuit are disposed symmetrically with respect to the center of a group of cells and form part of said group.

11. A device according to claim 1, wherein two circuits connected to one and the same elementary circuit receive signals from cells which are disposed symmetrically with respect to the center of a group of cells and form part of said group.

12. A device according to claim 1, wherein the time-delay of the delay line in an elementary circuit may differ from the time-delay of the delay line in any other elementary circuit of the same level within said hieararchized assembly of elementary circuits.

* * * * *